ically of a United States Patent

United States Patent [19]
Peppers et al.

[11] Patent Number: 4,714,310
[45] Date of Patent: Dec. 22, 1987

[54] METHOD AND APPARATUS FOR DYNAMIC FOCUSING CONTROL OF A RADIANT ENERGY BEAM

[75] Inventors: Norman A. Peppers, Belmont; Louis F. Schaefer, Palo Alto, both of Calif.

[73] Assignee: SRI International, Menlo Park, Calif.

[21] Appl. No.: 854,222

[22] Filed: Apr. 21, 1986

[51] Int. Cl.⁴ .................. G02B 26/08; G02B 17/00
[52] U.S. Cl. ........................ 350/6.6; 350/446
[58] Field of Search ............ 350/6.5, 6.6, 6.8, 446

[56] References Cited
U.S. PATENT DOCUMENTS

| | | | |
|---|---|---|---|
| 4,116,527 | 9/1978 | Sick | 350/6.7 |
| 4,256,364 | 3/1981 | Minoura et al. | 350/6.9 |
| 4,274,101 | 6/1981 | Kataok et al. | 350/6.6 |
| 4,383,755 | 5/1983 | Fedder et al. | 355/11 |
| 4,464,011 | 8/1984 | Takahashi et al. | 350/6.1 |

FOREIGN PATENT DOCUMENTS 0068015  4/1983  Japan .

*Primary Examiner*—John K. Corbin
*Assistant Examiner*—Vincent J. Lemmo
*Attorney, Agent, or Firm*—Victor R. Beckman

[57] ABSTRACT

Beam focusing and scanning method and apparatus are shown comprising a plane mirror (40) upon which a laser beam (32) is directed through a focusing lens (38). The beam is reflected back through the focusing lens (38) onto a pivotal mirror (52). The plane mirror (40) is movable back and forth along the beam axis, and the movement of plane mirror (40) and pivotal mirror (52) is synchronized whereby the beam is focused at the face of an object (54) while scanned across the object.

2 Claims, 8 Drawing Figures

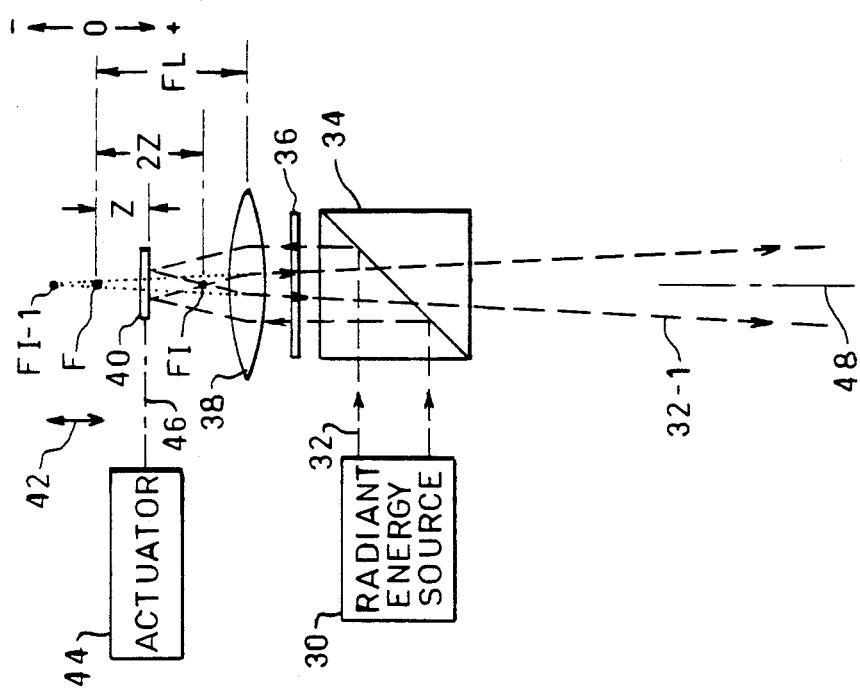
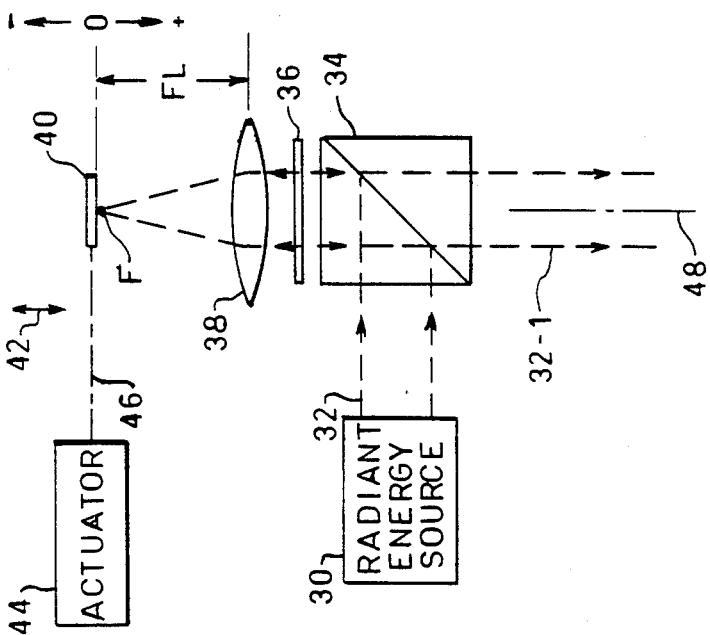

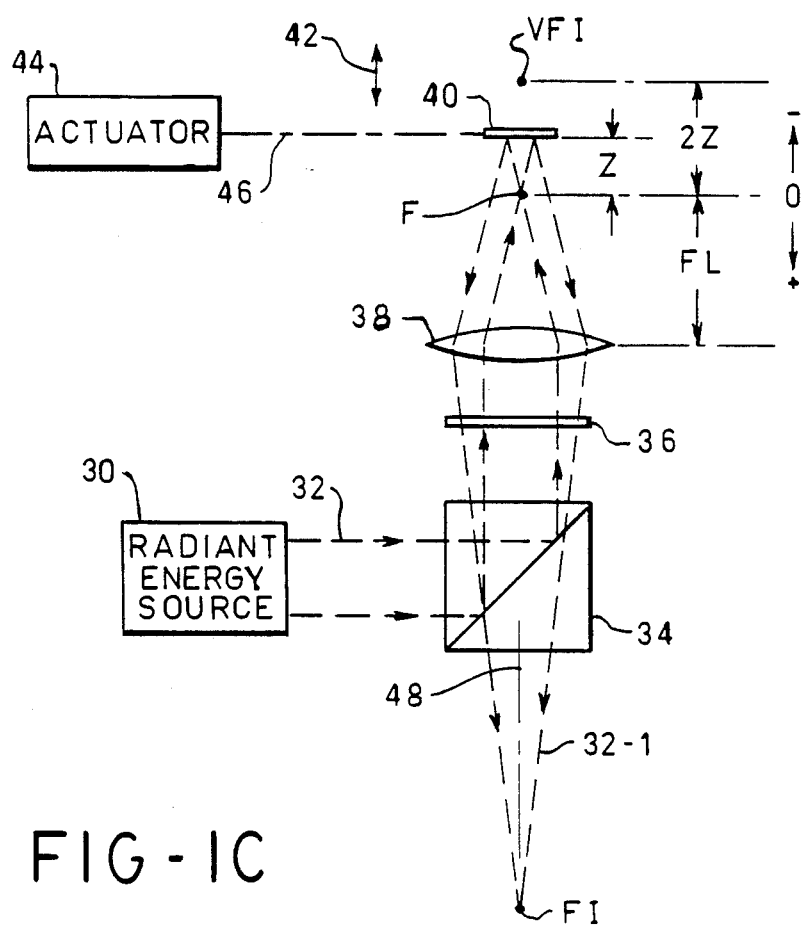
FIG-IC

METHOD AND APPARATUS FOR DYNAMIC FOCUSING CONTROL OF A RADIANT ENERGY BEAM

TECHNICAL FIELD

This invention relates to method and apparatus for controlling convergence or divergence of a radiant energy beam for use in dynamically controlling the focusing of a radiant energy beam and particularly to such a dynamic beam control means that is simple, inexpensive, and easily implemented.

BACKGROUND OF THE INVENTION

The distance from a radiation source at which a radiation beam is focused may be controlled by movement of one or more focusing lenses along the beam axis so as to change the focal point along the beam axis. With such prior art systems one or more lenses which are of relatively large mass must be moved. As is well understood, the larger the mass, the more difficult it is to rapidly accelerate the same. Consequently, the rate at which focusing may be changed with such prior art movable lens systems is limited by the mass of the lens and associated mounting mechanism to be moved. Furthermore, if the lens is not moved precisely along the beam axis, the beam will be deflected laterally at the movable lens thereby imparting undesired movement to the focal point. Control of movement of the lens, or lenses, precisely along the beam axis to prevent such unwanted beam deflection is difficult and expensive.

The focusing control system of the present invention is well adapted for use in a laser beam scanning system such as that used in the exposure of printing plates, the inspection of printed circuit boards, or the like. For example, it is useful in a scanning system that employs pre-deflection optics, i.e. a system wherein the laser beam passes through a focusing lens before it is deflected as by use of a rotating polygon, oscillating mirror, or the like. In scanning systems using pre-deflection optics, a very simple inexpensive lens is adequate to produce a diffraction-limited focused spot. However, with such systems the locus of the focused spot is not a straight line but is, in general, a curved line. If, for example, the deflector is an oscillating mirror whose axis of rotation is in the plane of the mirror, the locus of the focused spot is an arc of a circle. Generally, the desired focus is a straight line in which case the laser beam will be out of focus on the straight line except at one or two points where the arc is tangent to or intersects the line.

SUMMARY AND OBJECTS OF THE INVENTION

An object of this invention is the provision of an improved method and apparatus for dynamically controlling the convergence or divergence of a radiant energy beam.

An object of this invention is the provision of a dynamic focusing control system whereby shifting of the beam focal point may be easily, accurately, inexpensively and rapidly accomplished.

An object of this invention is the provision of a radiant energy beam scanning system which includes a novel dynamic focusing control of the above-mentioned type whereby focusing of the beam along a desired line, including a straight line, is readily accomplished.

An object of this invention is the provision of a radiant energy beam scanning system of the above-mentioned type which may be operated at high scanning rates with a high degree of accuracy.

An object of this invention is the provision of a radiant energy beam scanning system of the above-mentioned type which is of simple design and inexpensively and easily implemented.

An object of this invention is the provision of a radiant energy beam scanning system of the above-mentioned type which avoids short-comings and disadvantages of prior art scanning systems.

The present invention includes a radiant energy source together with focusing lens means for focusing radiation from the source. Energy from the focusing lens means is beamed onto a small plane reflecting means which reflects the beam from the focusing lens means back through the focusing lens means. The small reflecting means is movable along the beam axis for controlling the divergence and/or convergence of the reflected beam which exits from the focusing lens means. A beam splitter may be located in the path of radiation from the radiation beam source to the focusing lens means for separating the incident and reflected rays. If desired, a polarizing beam splitter and quarter-wave phase plate may be used in place of the beam splitter, together with a polarized beam source for better utilization of beam energy. The system is well adapted for use with a collimated beam source. With the small plane reflecting means located at the focal point of the focusing lens means, the reflected beam is recollimated by the focusing lens means. Movement of the small plane reflecting means toward and away from the focusing lens means relative to the focal point results in diverging and converging beams, respectively, from the focusing means. Since a small plane reflecting means of low mass may be employed, rapid movement of the reflecting means along the beam axis is possible for rapid divergence and convergence control of the beam. The beam from the system may be directed onto a pivotally mounted reflecting means to provide the beam with a scanning motion. By synchronizing operation of the pivotally mounted reflecting means and small plane mirror a focused beam may be produced wherein the focal point of the beam is scanned along a selected path, including a straight line path.

BRIEF DESCRIPTION OF THE DRAWINGS

The invention, together with further objects and advantages thereof will be better understood from the following description considered with the accompanying drawings. It will be understood that the illustrated embodiments of the invention are by way of example only and that the invention is not limited thereto. In the drawings, wherein like reference characters refer to the same parts in the several views:

FIGS. 1A, 1B and 1C are block diagrams showing a system for dynamic control of the divergence and convergence of a radiation beam which embodies the present invention, the small plane movable mirror being shown at different positions in the figures;

Figure 2:
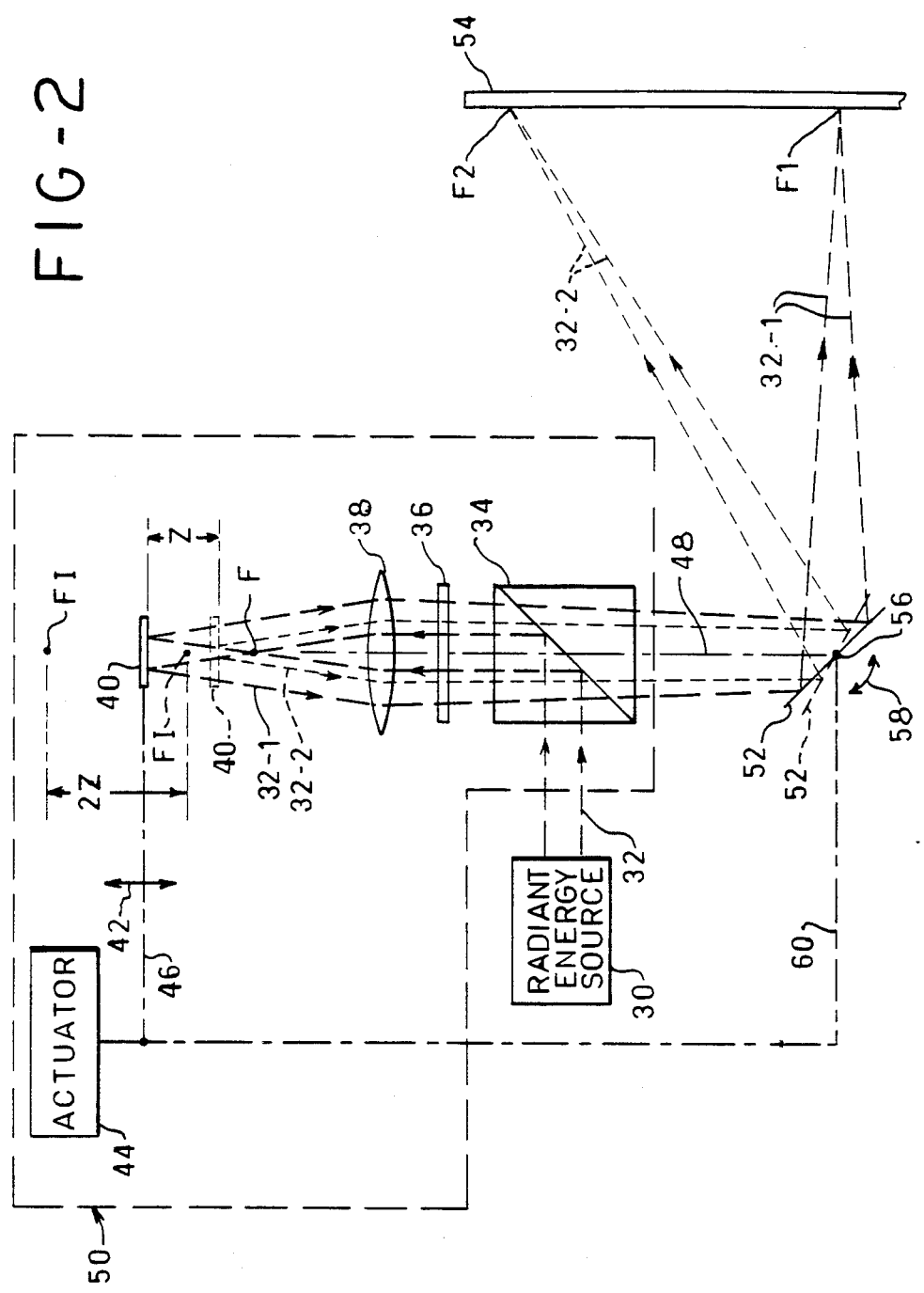
FIG. 2 is a block diagram showing a novel beam scanning system embodying the present invention which includes the novel dynamic control system of this invention.

Reference first is made to FIG. 1A wherein one form of dynamic beam control system embodying this invention is shown comprising a radiant energy source 30 for generating a beam 32 of radiation. For example, the radiant energy source 30 may include a laser and associated means for producing a collimated and polarized light beam. As will become apparent, the invention is not limited to use of a laser as the beam source, or to a collimated radiation beam source, or to a polarized beam.

The polarized collimated laser beam is incident on a polarizing beam splitter 34 where it is reflected through a quarter-wave phase plate 36 to focusing lens means 38 which may comprise either a spherical or cylindrical lens. In FIGS. 1A, 1B and 1C, 2 and 3 a spherical focusing lens is shown, and in the embodiment of FIGS. 4 and 5 a cylindrical focusing lens is shown. The beam is reflected back through the lens 38 and quarter-wave phase plate 36 to the beam splitter 34 by a small lightweight plane mirror, or reflecting means, 40. Mirror 40 is movable back and forth along the optical axis 48 of focusing lens means 38 in the direction of doubleheaded arrow 42 under control of actuator means 44 connected thereto through connecting means 46. Any suitable actuating means 44 may be employed including, for example, a motor, a piezoelectric device, an electrodynamic device, or the like. For rapid movement of mirror 40, it may be piezoelectrically or electrodynamically controlled. The light beam reflected from mirror 40 having passed twice through quarter-wave phase plate 36, is fully transmitted by the polarizing beam splitter 34. The beam reflected by mirror 40 is identified by reference character 32-1.

In the arrangement shown in FIG. 1A, 1B and 1C focusing lens means 38 has a focal length FL such that a collimated beam is brought to focus at the principal focus, or focal point, F, thereof. Also, while mirror 40 is movable, other elements shown in FIGS. 1A-1C are stationary.

COLLIMATED BEAM CASE

In FIG. 1A mirror 40 is shown positioned at the principal focus F of focusing lens means 38. With mirror 40 at the principal focus F of focusing lens means 38, the beam reflected by mirror 40 is recollimated by focusing lens means 38, as shown in FIG. 1A. From the above, it will be apparent that if the radiant energy beam 32 is collimated and the plane reflecting surface of mirror 40 is located at the focal plane of lens 38, the reflected beam 32-1 after passing through the lens 38 is collimated. Under these conditions, the image of the focused spot, F, after passing back through the lens 38 is located at +infinity or −infinity.

DIVERGING BEAM CASE

Reference now is made to FIG. 1B wherein plane mirror 40 is shown moved by actuator 44 a distance Z toward lens 38, in the +Z direction, from the focal plane of lens 38. In FIGS. 1A-1C the focal plane of lens 38 is shown at zero reference position. Movement of mirror 40 toward lens 38 from the focal plane is identified as movement in the positive direction and movement thereof away from lens 38 from the focal plane is identified as movement in the negative direction. Now, with a collimated beam 32 from source 30 and mirror 40 located a distance +Z from the focal plane, a real image, FI, of the focal point F is formed by mirror 40 a distance 2Z from the focal plane of lens 38. After passing through lens 38, the reflected beam 32-1 diverges from a vertical image, FI-1, of the focal point, F, which virtual image, FI-1 is located beyond the focal plane of lens 38 in the −Z direction. From the above it will be apparent that the amount of divergence of the beam 32-1 is controlled by the distance that mirror 40 is moved toward the focusing lens 38 from the focal plane by actuator 44; the divergence increasing as the distance Z increases, and decreasing as the distance Z decreases.

CONVERGING BEAM CASE

Reference now is made to FIG. 1C wherein the plane mirror 40 is shown moved by actuator 44 a distance Z, in the negative direction, from the focal plane of lens 38. In this position of mirror 40, and with a collimated beam input, a virtual image, VFI, of the focused spot F is formed by mirror 40 which is located a distance 2Z from the focal plane in the negative direction therefrom. A real image F1 of this spot is formed by reflected beam 32-1 after return through the focusing lens 38, which image F1 is located in the +Z direction from the lens.

The operation of the beam control system shown in FIGS. 1A-1C, when provided with a collimated beam input, may be summarized as follows. When the distance between focusing lens means 38 and plane mirror 40 is equal to the focal length, FL, of lens 38, the beam 32-1 which exits lens 38 in the +Z direction is collimated. (FIG. 1A.) When the distance between lens 38 and mirror 40 is less than the focal length, FL of lens 38, the reflected beam 32-1 which exits lens 38 is diverging away from a virtual image FI-1 that is located opposite mirror 40 from lens 38. (FIG. 1B.) When the distance between lens 38 and mirror 40 is greater than the focal length, FL, the reflected beam 32-1 that exits lens 38 is converging toward a real image F1 located opposite lens 38 from mirror 40. (FIG. 1C.) In all instances, the image formed by mirror 40 moves twice as far as the mirror moves. In the converging beam case, illustrated in FIG. 1C, there is a non-linear relationship between the location of mirror 40 and that of the focused spot F1. In any event, as mirror 40 is moved along the beam axis 40 away from focusing lens 38 and the focal plane of the lens, the focused spot F1 is moved along the beam axis toward the focusing lens 38.

The present invention shown in FIGS. 1A-1C and described above is usable in a wide variety of situations where beam focusing control is required. It is particularly well adapted where rapid beam focusing control is required. A very small, light-weight mirror 40 may be employed, which mirror is easily and rapidly movable along the beam axis for control of the point at which the beam is focused. Since a plane mirror 40 is employed, rotational movement of the mirror, or movement thereof normal to the beam axis, have no effect upon beam focusing, so long as the beam is incident upon the mirror. To avoid movement of the beam axis, the plane reflecting surface of mirror 40 simply must remain normal to the beam axis during travel thereof. In prior art systems wherein focusing control is provided by movement of a focusing lens, it is essential that the lens be moved axially of the incident beam, without movement across the beam, to avoid deflection of the beam axis by the movable lens. No such problem arises with applicant's invention wherein a plane movable reflecting means is employed for focusing purposes.

One use of the present invention which suggests itself to one skilled in this art is in an optical recording and/or playback system wherein a focused beam scans a movable optical medium, such as a rotatable optical disc. Small up and down motion of the rotating disc is compensated for by small axial movement of the focus point of the optical beam so as to maintain focus of the beam at the disc. With the present invention, the small mirror 40 may be included in a servomechanism for maintaining the desired beam focus.

BEAM SCANNING

Another use of the focusing control system of the present invention is in a beam scanning system wherein a scanning motion is imparted to the focused beam for scanning the beam across an object. Such a beam scanning system is shown in FIG. 2, to which figure reference now is made. The beam scanning system of FIG. 2 includes radiant energy source 30 for generating a collimated polarized light beam 32, and a dynamic beam focusing control unit 50 comprising a polarizing beam splitter 34, quarter-wave phase plate 36, focusing lens means 38 and small plane reflecting means, or mirror, 40 reciprocably driven by actuator 44 along the beam axis 48, which may be of the same type shown in FIG. 1 and described above. Small plane mirror 40 in the dynamic beam focusing control unit 50 is movable between the illustrated full and broken line positions along a path that is beyond the principal focus F of lens means 38. As noted above, with a collimated beam 32 input to focusing control unit 50, a converging beam exits the unit so long as movement of plane mirror 40 is restricted to a path located beyond the principal focus of focusing means 38.

The converging light beam from unit 50 is directed onto movable beam deflecting means 52, such as a plane mirror, for deflection onto an object, or workpiece, 54 to be scanned. For purposes of illustration only, and not by way of limitation, deflecting means 52 may comprise a plane mirror mounted for pivotal movement about axis 56 extending normal to the drawing in the plane of the mirror at the beam axis. Pivotal movement of the mirror, in the direction of double-headed arrow 58, is shown provided by connection of the mirror through connecting means 60 to motor, or actuator, 44. As will become apparent, movement of the reflecting means 40 and deflecting means 52 is synchronized in a manner such that the beam reflected from deflecting means 52 is focused at the face of object, or workpiece, 54 during the scanning operation.

With the illustrated system, movement of small plane reflecting means 40 a distance Z along the beam axis (between the illustrated full and broken line positions thereof) results in movement of the image FI of the focused spot F formed by mirror 40 a distance of 2Z along the beam axis. As noted above, in the operation of the system shown in FIG. 2, beam 32 is focused by lens means 38 at principal focus F ahead of reflecting means 40 whereby the beam reflected by reflecting means 40 converges after passing through focusing lens means 38. With reflecting means 40 and deflecting means 52 in the illustrated full line positions, the reflected and then deflected beam 32-1 is focused at point F1 at the face of object 54. As reflecting means 40 and deflecting means 52 are simultaneously moved toward the illustrated broken-line positions thereof under control of actuator 44, the focal point of the reflected and deflected beam moves from point F1 to point F2 at the face of object 54. By proper synchronization of the movement of beam reflecting means 40 and deflecting means 52, the focal point may be made to move along a straight line at the face of object 54.

Obviously, the invention is not limited to rectilinear movement of the beam focal point. With different synchronous operation of the reflecting and deflecting means 40 and 52, curved lines may be traced by the focused spot, the locus of which spot is determined by the relative positions of the reflecting and deflecting means at any instant of time during a complete cycle of operation thereof. Also, it will be apparent that the invention is not limited to movement of deflecting means 52 about pivot axis 56 in the plane thereof. For example, deflecting means 52 may be pivoted about an axis which is spaced therefrom, which axis may or may not be parallel to the face thereof. Alternatively, a multi-sided reflecting means which is rotated about a central axis may be employed for deflecting the beam to produce the desired scanning motion of the focused beam.

Figure 3:
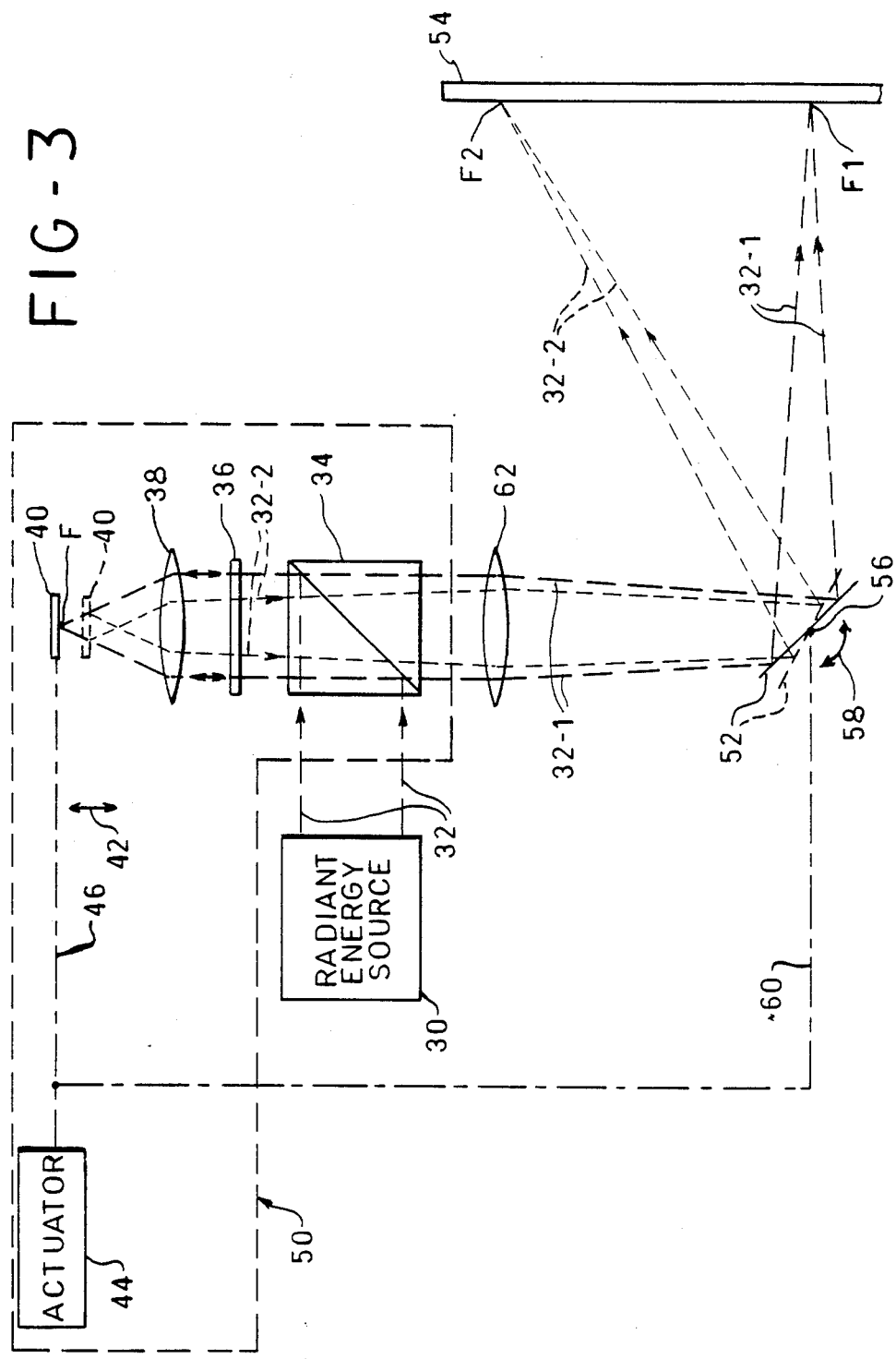
FIG. 3 is a block diagram showing a modified form of scanning system that embodies this invention.

Reference now is made to FIG. 3 wherein a modified form of this invention is shown which includes second focusing lens means 62 located between the polarizing beam splitter 34 and pivotal deflecting means 52. The other components of the system are the same as illustrated in FIG. 2 and the description thereof will not be repeated here. In this system the plane reflecting means 40 may be moved ahead of or beyond the principal focus F of lens means 38 in its reciprocal motion. That is, the distance between lens means 38 and reflecting means 40 may vary from less than to greater than the focal length of lens means 38. For purposes of illustration only, at the upper end of travel of reflecting means 40 reflecting means 40 is located at the principal focus F of focusing lens means 38. With reflecting means 40 located at the principal focus, as shown in the full line position thereof, light beam 32-1 reflected by reflecting means 40 is recollimated by focusing lens means 38 and is transmitted through quarter-wave phase plate 36 and polarizing beam splitter 34 to the second focusing lens means 62. From focusing lens means 62, light beam 32-1 is reflected by pivotal deflecting means 52 onto the face of object 54 at the focus spot F1 of the beam.

As with the FIG. 2 arrangement, the reflecting and deflecting means 40 and 52 are simultaneously moved for movement of the focused spot along the face of the object. With this arrangement, when reflecting means 40 is moved forward toward lens means 38, it is moved ahead of the principal focus F of lens means 38 whereby the reflected light 32-2 is diverging after passing through lens means 38. In FIG. 3, the diverging light beam from lens means 38 is returned to a converging beam at lens means 62 which is focused at point F2 on object 54 when reflecting and deflecting means 40 and 52 are in the illustrated broken-line positions. In both the FIG. 2 and FIG. 3 arrangements it will be apparent that deflecting means 52 may be pivoted downwardly for deflection of the reflected beam to a level below focal point F1. For simplicity of illustration, only two positions of reflecting and deflecting means 40 and 52 are shown in the drawings. In the FIG. 3 arrangement, reflecting means 40 also may be moved upwardly away from the focusing lens means 38 and principal focus F in which case the beam reflected from reflecting means 40 would be a converging beam, as in the FIG. 2 system, in which case it would be focused nearer pivotal deflecting means 52 than focused spot F1 which results when reflecting means 40 is located at principal focus F.

One advantage of the FIG. 3 arrangement over that of FIG. 2 is that operation with a substantially collimated reflected beam (32-1 and 32-2) is possible thereby minimizing aberrations caused by beam splitter 34. To avoid aberrations it is generally good practice to keep the beam nearly collimated when passing through thick beam splitter 34. By including extra lens 62 in the system, the primary convergence of the reflected beam is caused by focusing lens 62, and the dynamic focus compensation system may be operated so as to merely make small changes in convergence or divergence to a nominally collimated reflected beam (32-1 and 32-2) that passes through beam splitter 34.

DYNAMIC ASTIGMATISM —I

In the systems illustrated in FIGS. 1A-1C, 2 and 3, a spherical lens 38 is shown for purposes of illustration whereby the beam which exits the lens is symmetrical about the beam axis. Obviously, it will be apparent that other focusing lens means, such as a cylindrical focusing lens may be used in place of, or in addition to, spherical lens 38. In an arrangement shown in FIGS. 4 and 5, to which figures reference now is made, a cylindrical focusing lens 70 is shown in place of spherical focusing lens 38. The remainder of the components are the same as shown in FIGS. 1A-1C.

Figure 4:
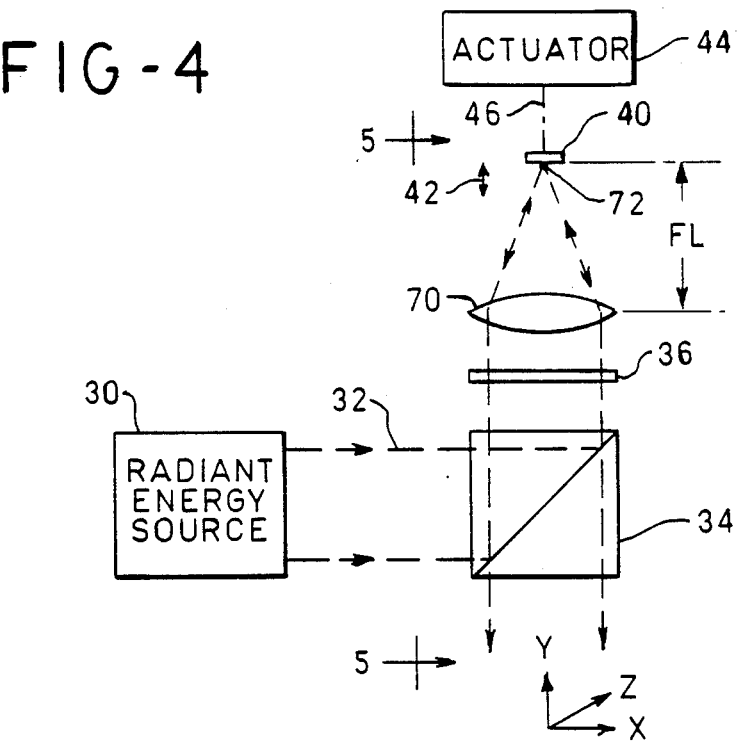
FIG. 4 is a block diagram of a system that is similar to that shown in FIGS. 1A, 1B and 1C but showing the use of a cylindrical focusing lens therein instead of a spherical focusing lens.
Figure 5:
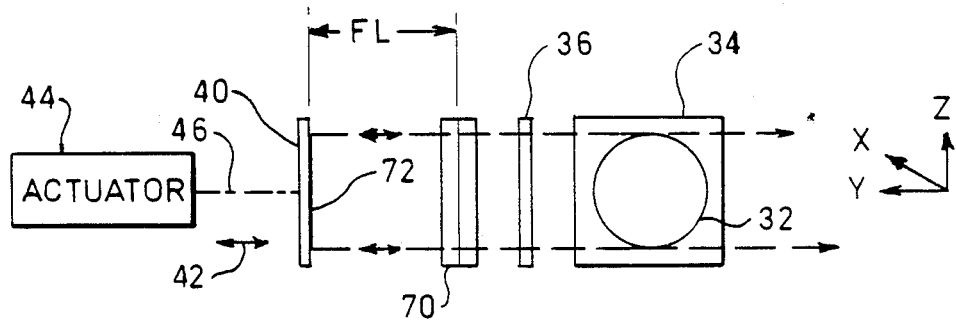
FIG. 5 is a sectional view taken along line 5—5 of FIG. 4.

Cylindrical focusing lens 70 has a focal length FL whereby rays of collimated beam 32 that are in a plane parallel to the X,Y plane are brought to focus along line 72, as seen in FIG. 4. The cylinder lens 70 has no optical power for rays in planes parallel to the Y,Z plane, and therefore they remain collimated independent of the position of mirror 40. In FIGS. 4 and 5, mirror 40 is shown at line focus 72 whereby the focused rays reflected from the mirror are recollimated after returning through cylindrical focusing lens 70. By moving mirror 40 forward, ahead of line focus 72 rays in planes parallel to the X,Y plane will diverge to provide the beam with a negative (—) astigmatism, and by moving mirror 40 rearwardly, beyond line focus 72, these rays will converge to provide the beam with a positive (+) astigmatism. With this arrangement an astigmatic beam can be generated with an arbitrary amount of astigmatism of either sign.

DYNAMIC ASTIGMATISM —II

Figure 6:
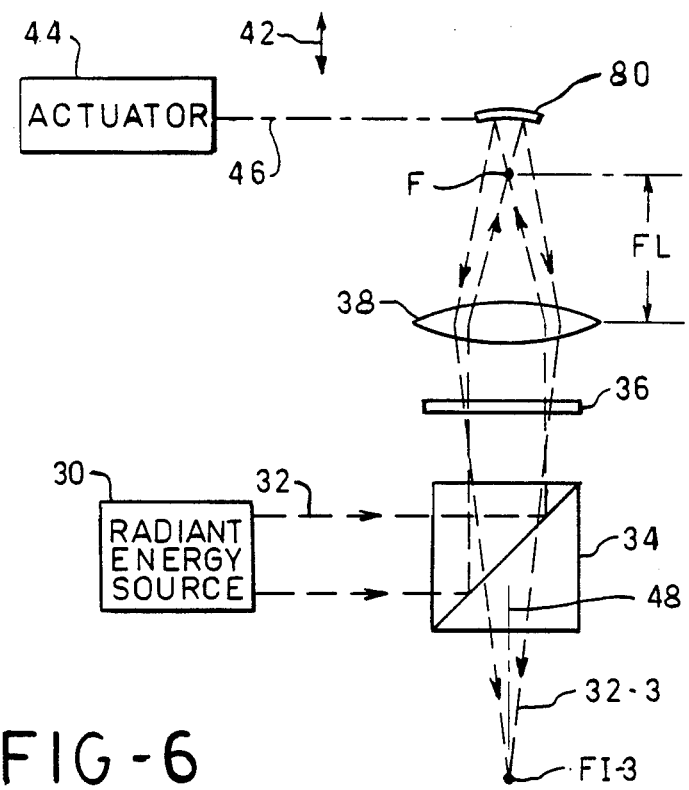
FIG. 6 is a block diagram of a system that is similar to that shown in FIGS. 1A-1C but showing the use of a cylindrical reflecting means therein instead of a plane reflecting means.

Reference now is made to FIG. 6 wherein another form of this invention is shown. The system shown in FIG. 6 is the same as that shown in FIGS. 1A-1C except a small axially movable mirror 80 having optical power is used in place of plane mirror 40. In FIG. 6 a spherical lens 38 is shown together with concave cylindrical mirror 80. Obviously, a convex cylindrical mirror could be used instead of the illustrated concave cylindrical mirror.

Cylindrical mirror 80 has optical power for rays in the X, Y plane, but no optical power for rays in the Y, Z plane. As with the system shown in FIGS. 1A-1C, when the surface of cylindrical mirror 80 is at the focal point, F, of spherical lens 38, the light leaving the system is collimated, assuming a collimated beam 32 input, and when mirror 80 is moved axially, the light leaving the system diverges or converges, depending upon the direction of movement of the mirror. However, although the convergence or divergence of fan rays in both the X, Y and the Y, Z planes is affected by axial movement of cylindrical mirror 80, the convergence or divergence changes at unequal rates, depending upon the cylindrical power of mirror 80. For example, in FIG. 6, fan rays 32-3 in the X,Y plane are brought to focus at point FI-3, which is nearer beam splitter 34 than the point at which fan rays in the Y,Z plane are brought to focus. This is in contradistinction to the arrangement of FIGS. 4 and 5, which includes a cylindrical lens 70 and plane mirror 40, for which one set of rays remain collimated, but the collimation of the other set of rays is affected by axial movement of mirror 40. This also is in contradistinction to the arrangement of FIGS. 1A-1C, 2 and 3, which includes a spherical lens 38 and plane mirror 40, for which the collimation of both sets of rays is affected equally with axially movement of mirror 40. The beam control system shown in FIG. 6 is well adapted for use in a flat bed laser scanner system that uses a parabaloid (a surface of revolution) mirror for correcting focus of both types of fan rays but at different rates. In the FIG. 6 arrangement, it will be apparent that lateral movement of axially movable mirror 80 in the X direction is to be avoided.

The invention having been described in detail in accordance with requirements of the patent statutes, other changes and modifications will suggest themselves to those skilled in this art. For example, although simple focusing lens means 38 and 62 are shown, these may comprise lens doublets, or lens systems, if desired. Also, actuator means 44 may comprise separate actuators for individually moving reflecting means 40 and deflecting means 52, in which case other means, such as a servomechanism may be used for synchronizing operation of the actuators to provide the beam focus with the desired locus. For example, the condition of focus may be sensed along the desired line of focus, or on a conjugate image formed by a beam splitter, and a focus defect error then used to drive the actuator that positions reflecting means 40 for focusing along the line. Alternatively, the actuator for reflecting means 40 could be driven by an error signal that is the difference between the actual position of reflecting means 40, which is sensed, and the required position for compensation which is known a priori from system parameters. Servo-systems which may be used to synchronize movement of reflecting and deflecting means 40 and 52 are well known and require no detailed description. Obviously, the dynamic beam focusing system is not limited to use with a collimated beam input. If desired, converging or diverging beam inputs may be supplied to the system. Also, it will be apparent that a non-polarizing beam splitter may be used in lieu of polarizing beam splitter 34, in which event neither quarter-wave phase plate 36 nor a beam source that is polarized would be required. Of course beam energy loses with such a dynamic beam focusing system would be greatly increased. Additionally, as noted above, dynamic focusing of radiation other than light is contemplated, along with different radiation beam sources. Also, in the FIGS. 4 and 5 arrangement, a spherical and cylindrical focus lens combination may be used in place of cylindrical focusing lens 70. It is intended that the above and other such changes and modifications shall fall within the spirit and scope of the invention as defined in the appended claims.

We claim:

1. A system for dynamic control of the divergence or convergence of a radiant energy beam comprising:
   a radiant energy source,
   cylindrical focusing lens means in the path of radiation from the radiant energy source to provide a converging radiant energy beam in one plane,
   a movable plane mirror for reflecting the radiant energy beam from the cylindrical focusing lens means back through the cylindrical focusing lens means, and
   means for moving the plane mirror along the beam axis for controlling convergence or divergence of the reflected radiant energy beam from the cylindrical focusing lens means in said one plane, convergence or divergence of the reflected radiant energy beam from the cylindrical focusing lens means being affected in said one plane which one plane contains the beam axis and extends across the cylindrical focusing lens means, and being unaffected in a plane perpendicular to said one plane containing the beam axis and extending longitudinally of the cylindrical focusing lens means, with movement of the plane mirror along the beam axis.

2. A system for dynamic control of the divergence or convergence of a radiant energy beam comprising,
   a radiant energy source,
   spherical focusing lens means in the path of radiation from the radiant energy source to provide a converging radiant energy beam,
   a movable cylindrical reflector for reflecting the radiant energy beam from the spherical focusing lens means back through the focusing lens means, and
   means for moving the cylindrical reflector along the beam axis for controlling convergence or divergence of the reflected energy beam from the spherical focusing lens means, convergence or divergence of the reflected radiant energy beam from the spherical focusing lens means being unequally affected in both of two perpendicular planes containing the beam axis, one of which planes extends across the cylindrical reflector and the other of which extends longitudinally thereof.

* * * * *